(12) United States Patent
Liu et al.

(10) Patent No.: US 11,184,827 B2
(45) Date of Patent: Nov. 23, 2021

(54) NETWORK SWITCHING METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 15/931,331

(22) Filed: May 13, 2020

(65) Prior Publication Data

US 2020/0275337 A1 Aug. 27, 2020

Related U.S. Application Data

(63) Continuation of application No. PCT/CN2017/110966, filed on Nov. 14, 2017.

(51) Int. Cl.
*H04W 4/00* (2018.01)
*H04W 36/30* (2009.01)
(Continued)

(52) U.S. Cl.
CPC ....... *H04W 36/30* (2013.01); *H04W 36/0044* (2013.01); *H04W 36/0058* (2018.08);
(Continued)

(58) Field of Classification Search
CPC . H04W 24/10; H04W 36/00; H04W 36/0044; H04W 36/0058; H04W 36/0066;
(Continued)

(56) References Cited

U.S. PATENT DOCUMENTS

| 2002/0105927 A1* | 8/2002 | Holma | H04W 36/0061 |
| | | | 370/331 |
| 2012/0063421 A1* | 3/2012 | Wu | H04W 36/0066 |
| | | | 370/332 |

(Continued)

FOREIGN PATENT DOCUMENTS

| CN | 1972502 | 5/2007 |
| CN | 101668322 | 3/2010 |

(Continued)

OTHER PUBLICATIONS

WIPO, ISR for PCT/CN2017/110966, Aug. 1, 2018.
(Continued)

*Primary Examiner* — Matthew W Genack
(74) *Attorney, Agent, or Firm* — Hodgson Russ LLP

(57) ABSTRACT

Provided are a network switching method, a network device, and a terminal device. The method comprises: a network device acquiring channel quality state information, the channel quality state information being used to reflect the channel quality of a second network; and when the network device determines that a first service ends or a serving network of a terminal device does not support the first service, determining, according to the channel quality state information, whether to switch the serving network from a first network to the second network.

16 Claims, 4 Drawing Sheets

(51) Int. Cl.
*H04W 76/30* (2018.01)
*H04W 76/27* (2018.01)
*H04W 36/00* (2009.01)

(52) U.S. Cl.
CPC ....... *H04W 36/0066* (2013.01); *H04W 76/27* (2018.02); *H04W 76/30* (2018.02)

(58) Field of Classification Search
CPC ... H04W 36/14; H04W 36/16; H04W 36/165; H04W 36/18; H04W 36/20; H04W 36/22; H04W 36/24; H04W 36/245; H04W 36/26; H04W 36/28; H04W 36/30; H04W 76/27; H04W 76/30
See application file for complete search history.

(56) References Cited

U.S. PATENT DOCUMENTS

| | | | |
|---|---|---|---|
| 2015/0264597 A1 | 9/2015 | Zhang et al. | |
| 2015/0341148 A1* | 11/2015 | Kazmi | H04L 5/0098 370/252 |
| 2015/0350963 A1 | 12/2015 | Yang et al. | |
| 2017/0041944 A1* | 2/2017 | Yang | H04W 72/1242 |
| 2017/0094565 A1* | 3/2017 | Sharma | H04L 65/1016 |
| 2017/0295502 A1* | 10/2017 | Stirling-Gallacher | H04B 7/024 |

FOREIGN PATENT DOCUMENTS

| | | |
|---|---|---|
| CN | 101902793 | 12/2010 |
| CN | 101980569 | 2/2011 |
| CN | 104469975 | 3/2015 |
| EP | 2222119 | 8/2010 |

OTHER PUBLICATIONS

"3rd Generation Partnership Project; Technical Specification Group Services and System Aspects; System Architecture for the 5G System; Stage 2 (Release 15)," 3GPP TS 23.501, Jun. 2017, v1.0.0, 147 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300, Dec. 2015, v13.2.0, 290 pages.
EPO, Extended European Search Report for EP Application No. 17932358.9, dated Oct. 29, 2020.
Ericsson, "Inter-RAT RRM measurements for NR and LTE," 3GPP TSG-RAN WG2 #98, Tdoc R2-1705430, May 2017, 4 pages.
Oppo et al., "Discussion for returning back to NR in case of handover for voice," SA WG2 Meeting #122bis, S2-176976, Oct. 2017, 3 pages.
"5G; Procedures for the 5G System (3GPP TS 23.502 version 15.2.0 Release 15)," ETSI TS 123 502, Jun. 2018, v15.2.0, 311 pages.
EPO, Partial Supplementary European Search Report for EP Application No. 17932358.9, dated Jul. 29, 2020.
EPO, Communication for EP Application No. 17932358.9, dated Mar. 17, 2021.
EPO, Communication for EP Application No. 17932358.9, dated Jun. 29, 2021.

* cited by examiner

NETWORK SWITCHING METHOD, NETWORK DEVICE, AND TERMINAL DEVICE

CROSS-REFERENCE TO RELATED APPLICATION

This application is a continuation of International Application No. PCT/CN2017/110966, filed on Nov. 14, 2017, the entire disclosure of which is incorporated herein by reference.

TECHNICAL FIELD

Embodiments of the present disclosure relate to the field of communications, and more specifically, to a method for switching a network, a network device, and a terminal device.

BACKGROUND

In the initial stage of 5G New Radio (NR) network deployment, in some scenarios (for example, network congestion, requiring voice services, etc.), there will be a fall back from 5G NR network to 4G Long Term Evolution (LTE) network. At this stage, there is a demand for quickly returning to the 5G NR network for a better user experience.

SUMMARY

A method for switching a network, a network device, and a terminal device are provided.

In a first aspect, there is provided a method for switching a network, including:

obtaining, by a network device, channel quality status information, wherein the channel quality status information is used to reflect the channel quality of a second network; and determining, by the network device, when determining that a first service is ended or a service network of a terminal device does not support the first service, whether to switch the service network from a first network to the second network according to the channel quality status information.

In some implementations, the channel quality status information is a measurement result report sent by the terminal device.

In some implementations, before the network device receives the measurement result report sent by the terminal device, the method further includes:

sending, by the network device, a release command to the terminal device, wherein the release command is used to instruct the terminal device to release the first service; and the network device receives the measurement result report sent by the terminal device, includes:

obtaining, by the network device, a response message to the release command which is sent by the terminal device, wherein the response message includes the measurement result report.

In some implementations, the network device receives the measurement result report sent by the terminal device, includes:

periodically receiving, by the network device, the measurement result report sent by the terminal device.

In some implementations, the network device receives the measurement result report sent by the terminal device, includes:

receiving within a specific time unit, by the network device, the measurement result report sent by the terminal device.

In some implementations, a number of times for sending the measurement result report by the terminal device is a fixed number of times.

In some implementations, before the network device receives the measurement result report sent by the terminal device, the method further includes:

sending, by the network device, configuration information to the terminal device, wherein the configuration information includes at least one of the following information:

a period, a number of times and a specific time unit for sending the measurement result report; and the network device receives the measurement result report sent by the terminal device includes:

receiving, by the network device, the measurement result report according to the indication information.

In some implementations, before the network device receives the measurement result report sent by the terminal device, the method further includes:

sending, by the network device, first indication information to the terminal device, where the first indication information is used to instruct the terminal device to send the measurement result report to the network device.

In some implementations, the sending, by the network device, the first indication information to the terminal device includes:

sending, by the network device, radio resource control RRC signaling to the terminal device, wherein the RRC signaling includes the first indication information.

In some implementations, the sending, by the network device, the first indication information to the terminal device includes:

the network device sending or receiving data on a first bearer, and instructing the terminal device to send the measurement result report to the network device through the first bearer; or the network device sending or receiving a first quality of service QoS stream or a first data stream, and instructing the terminal device to send the measurement result report to the network device through the first QoS stream or the first data stream.

In some implementations, the sending, by the network device, the first indication information to the terminal device, includes:

sending, by the network device, a release command to the terminal device, wherein the release command is used to instruct the terminal device to release the first service, and the release command includes the first indication information.

In some implementations, the first service is used to trigger the terminal device to send the measurement result report to the network device.

In some implementations, the channel quality status information is second indication information sent by the terminal device, wherein the second indication information is used to indicate that the second network is available, or the second indication information is used to indicate that the second network is unavailable; wherein the determining, by the network device, when determining that the first service is ended or the service network of the terminal device does not support the first service, whether to switch the service network from the first network to the second network according to the channel quality status information, includes:

when the network device determines that the first service is ended or the service network does not support the first service, the network device determines whether to switch the service network of the terminal device from the first network to the second network according to the second indication information.

In some implementations, the obtaining, by a network device, the channel quality status information, includes:

obtaining, by the network device, the channel quality status information from a candidate network, wherein the candidate network includes the second network.

In some implementations, the candidate network can obtain the channel quality status information through an uplink signal of the terminal device.

In some implementations, the candidate network is a network having a direct or indirect interface with a network where the network device is located.

In some implementations, the channel quality status information includes channel quality status information of the candidate network.

In some implementations, the first service is any one of:
a service on a second bearer, a second data stream, and a second quality of service QoS stream.

In a second aspect, there is provided a method for switching a network, including:

determining, by a terminal device, channel quality status information, wherein the channel quality status information is used to reflect a channel quality of a second network; and sending, by the terminal device, the channel quality status information to a network device, so that the network device, when determining that a first service is ended or a service network of the terminal device does not support the first service, determines whether to switch the service network from a first network to the second network according to the channel quality status information.

In some implementations, the channel quality status information is a measurement result report of the terminal device; and wherein the sending, by the terminal device, the channel quality status information to the network device, includes:

sending, by the terminal device, the measurement result report to the network device.

In some implementations, before the terminal device sends the measurement result report to the network device, the method further includes:

receiving, by the terminal device, a release command sent by the network device, wherein the release command is used to instruct the terminal device to release the first service;

wherein the sending, by the terminal device, the measurement result report to the network device, includes:

sending, by the terminal device, a response message to the release command to the network device, wherein the response message includes the measurement result report.

In some implementations, the sending, by the terminal device, the measurement result report to the network device, includes:

periodically sending, by the terminal device, the measurement result report to the network device.

In some implementations, the sending, by the terminal device, the measurement result report to the network device, includes:

sending, by the terminal device, the measurement result report to the network device within a specific time unit.

In some implementations, a number of times for sending the measurement result report by the terminal device is a fixed number of times.

In some implementations, before the terminal device sends the measurement result report to the network device, the method further includes:

receiving, by the terminal device, configuration information sent by the network device, wherein the configuration information includes at least one of the following information: a period, a number of times and a specific time unit for sending the measurement result report; and wherein the sending, by the terminal device, the measurement result report to the network device, includes:

sending, by the terminal device, the measurement result report to the network device according to the indication information.

In some implementations, before the terminal device sends the measurement result report to the network device, the method further includes:

receiving, by the terminal device, first indication information sent by the network device, wherein the first indication information is used to instruct the terminal device to send the measurement result report to the network device.

In some implementations, the receiving, by the terminal device, the first indication information sent by the network device, includes:

receiving, by the terminal device, radio resource control RRC signaling sent by the network device, wherein the RRC signaling includes the first indication information.

In some implementations, the receiving, by the terminal device, the first indication information sent by the network device, includes:

the terminal device receiving or sending data on a first bearer and being instructed to send the measurement result report to the network device through the first bearer; or the terminal device receiving or sending a first quality of service QoS stream or a first data stream, and being instructed to send the measurement result report to the network device through the first QoS stream or the first data stream.

In some implementations, the receiving, by the terminal device, the first indication information sent by the network device, includes:

receiving, by the terminal device, a release command sent by the network device, wherein the release command is used to instruct the terminal device to release the first service, and the release command includes the first indication information.

In some implementations, the sending, by the terminal device, the measurement result report to the network device, includes:

when the terminal device starts a second service, a protocol of the second service triggers the terminal device to send the measurement result report to the network device.

In some implementations, the determining, by a terminal device, the channel quality status information, includes:

generating second indication information by the terminal device, wherein the second indication information is used to indicate that the second network is available, or the second indication information is used to indicate that the second network is not available; and wherein the sending, by the terminal device, the channel quality status information to the network device, includes:

sending, by the terminal device, the second indication information to the network device.

In some implementations, the generating second indication information by the terminal device, includes:

generating the indication information when the channel quality status information of the second network is greater than or equal to a first threshold; or, generating the indication information when a status packet error rate of the second network is less than or equal to a second threshold.

In some implementations, the determining, by a terminal device, the channel quality status information, includes:

the network device acquiring the channel quality status information from a candidate network, wherein the candidate network includes the second network.

In some implementations, the candidate network can obtain the channel quality status information through an uplink signal of the terminal device.

In some implementations, the candidate network is a network having a direct or indirect interface with a network where the network device is located.

In some implementations, the channel quality status information includes channel quality status information of the candidate network.

In some implementations, the first service is any one of:

a service on a second bearer, a second data stream, and a second quality of service QoS stream.

In a third aspect, there is provided a network device, including:

a transceiver unit configured to obtain channel quality status information, wherein the channel quality status information is used to reflect the channel quality of a second network; and a processing unit configured to determine, when determining that a first service is ended or a service network of a terminal device does not support the first service, whether to switch the service network from a first network to the second network according to the channel quality status information.

In a fourth aspect, there is provided a network device, including:

a transceiver configured to obtain channel quality status information, wherein the channel quality status information is used to reflect the channel quality of a second network; and a processor configured to determine, when determining that a first service is ended or a service network of a terminal device does not support the first service, whether to switch the service network from a first network to the second network according to the channel quality status information.

In a fifth aspect, there is provided a terminal device, including:

a processing unit configured to determine channel quality status information, wherein the channel quality status information is used to reflect a channel quality of a second network; and a transceiver unit configured to send the channel quality status information to a network device, so that the network device, when determining that a first service is ended or a service network of a terminal device does not support the first service, determines whether to switch the service network from a first network to the second network according to the channel quality status information.

In a sixth aspect, there is provided a terminal device, including:

a processor configured to determine channel quality status information, wherein the channel quality status information is used to reflect a channel quality of a second network; and a transceiver configured to send the channel quality status information to a network device, so that the network device, when determining that a first service is ended or a service network of a terminal device does not support the first service, determines whether to switch the service network from a first network to the second network according to the channel quality status information.

In a seventh aspect, a computer-readable medium is provided for storing a computer program, the computer program including instructions for executing the method embodiment of the first aspect or the second aspect.

In an eighth aspect, a computer chip is provided, including: an input interface, an output interface, at least one processor, and a memory, wherein the processor is configured to execute codes in the memory, and when the codes are executed, the processor may implement each step performed by the network device in the method for switching a network in the first aspect or the second aspect.

In a ninth aspect, a computer chip is provided, including: an input interface, an output interface, at least one processor, and a memory, wherein the processor is configured to execute codes in the memory, and when the codes are executed, the processor may implement each step performed by the terminal device in the method for switching a network in the first aspect or the second aspect.

In a tenth aspect, a communication system is provided, including the network device and the terminal device described above.

DETAILED DESCRIPTION

The technical solutions in the embodiments of the present application will be clearly and completely described below with reference to the accompanying drawings in the embodiments of the present application.

The technical solutions in the embodiments of the present application can be applied to a 5G NR communication system.

Figure 1:
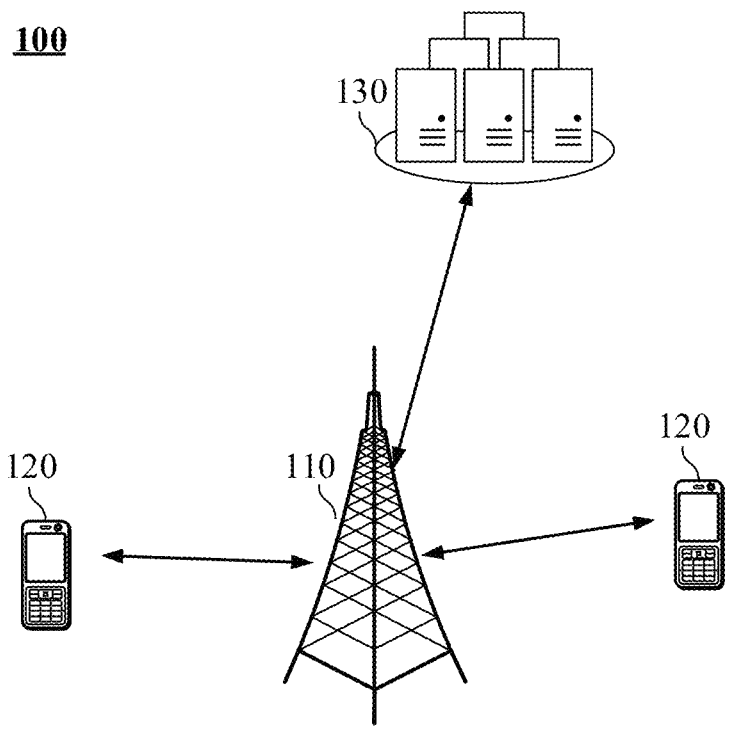
FIG. 1 is an example of an application scenario of the present disclosure.

FIG. 1 shows a wireless communication system 100 applied in an embodiment of the present application. The wireless communication system 100 may include an access network device 110. The access network device 110 may be a device that communicates with a terminal device. The access network device 110 may provide communication coverage for a specific geographic area, and may communicate with a terminal device (such as a UE) located within the coverage area. Optionally, the access network device 110 may be a Next Generation Radio Access Network (NG RAN), or a base station (gNB) in an NR system, or a Cloud Radio Access Network (CRAN), or the access network device can be a relay station, an access point, a vehicle-mounted device, a wearable device, or a network device in a future evolved public land mobile network (PLMN), etc. Optionally, the access network device 110 may also be a base station in an LTE system, for example, an Evolved Universal Terrestrial Radio Access Network (E-UTRAN) device.

The wireless communication system 100 further includes at least one terminal device 120 located within the coverage of the access network device 110. The terminal device 120 may be mobile or fixed. Optionally, the terminal device 120 may refer to an access terminal, user equipment (UE), a user unit, a user station, a mobile station, a mobile site, a remote station, a remote terminal, a mobile device, a user terminal, a terminal, a wireless communication device, a user agent, or a user device. The access terminal can be a cell phone, a cordless phone, a Session Initiation Protocol (SIP) phone, a Wireless Local Loop (WLL) station, a Personal Digital Assistant (PDA), and a handheld device having a wireless communication function, a computing device, or other processing device connected to a wireless modem, a vehicle-mounted device, a wearable device, a terminal device in a future 5G network or a terminal device in a future evolved PLMN.

The wireless communication system 100 further includes a core network device 130 that communicates with the access network device. Optionally, the core network device 130 may be a 5G core network device, for example, an access and mobility management function (AMF), and for another example, a session management function (SMF). Optionally, the core network device 130 may also be an Evolved Packet Core (EPC) device of the LTE network, for example, a Session Management Function+Core Packet Gateway (SMF+PGW-C) device.

It should be understood that the SMF+PGW-C can realize both functions that the SMF and the PGW-C can achieve.

Optionally, in the embodiment of the present application, the AMF may perform information interaction with the SMF. For example, the SMF obtains some information on the radio access network side from the AMF.

Optionally, in the embodiment of the present application, the AMF may obtain a fallback identifier from the radio access network or a message for indicating that the stream/first bearer for the terminal device was not successfully established.

FIG. 1 exemplarily shows an access network device, a core network device, and two terminal devices. Optionally, the wireless communication system 100 may include a plurality of access network devices and the coverage of each access network device may include other numbers of terminal devices, which are not limited in the embodiments of the present application.

Optionally, the wireless communication system 100 may further include a Mobile Management Entity (MME), Unified Data Management (UDM), Authentication Server Function (AUSF), and User Plane Function (UPF), Signaling Gateway (SGW), and other network entities which are not specifically limited in this embodiment of the present application.

It should be understood that the terms "system" and "network" are often used interchangeably herein. The term "and/or" in this document is only a kind of association relationship describing related objects, which means that there can be three kinds of relationships, for example, A and/or B can mean: A exists alone, A and B exist simultaneously, and B exists alone, these three cases. In addition, the character "/" in this text generally indicates that the related objects are in an "or" relationship.

In the initial stage of 5G New Radio (NR) network deployment, in some scenarios (for example, network congestion, requiring voice services, etc.), there will be a fall back from 5G NR network to 4G Long Term Evolution (LTE) network. However, at this stage, after the fall back from the 5G NR network to the 4G LTE network, it is not addressed as how to return to the 5G NR network. Therefore, after the fall back from the 5G NR network to the 4G LTE network, it is not possible to quickly return to 5G NR network, which affects user experience.

In order to solve the above problem, in the embodiment of the present disclosure, a method for switching a network is proposed.

When determining a first service is ended or a service network of the terminal device does not support the first service, the network device determines whether to switch the service network of the network device from a first network to a second network. Furthermore, it can ensure that users can use the 5G NR network to the maximum extent, thereby improving the user experience.

Figure 2:
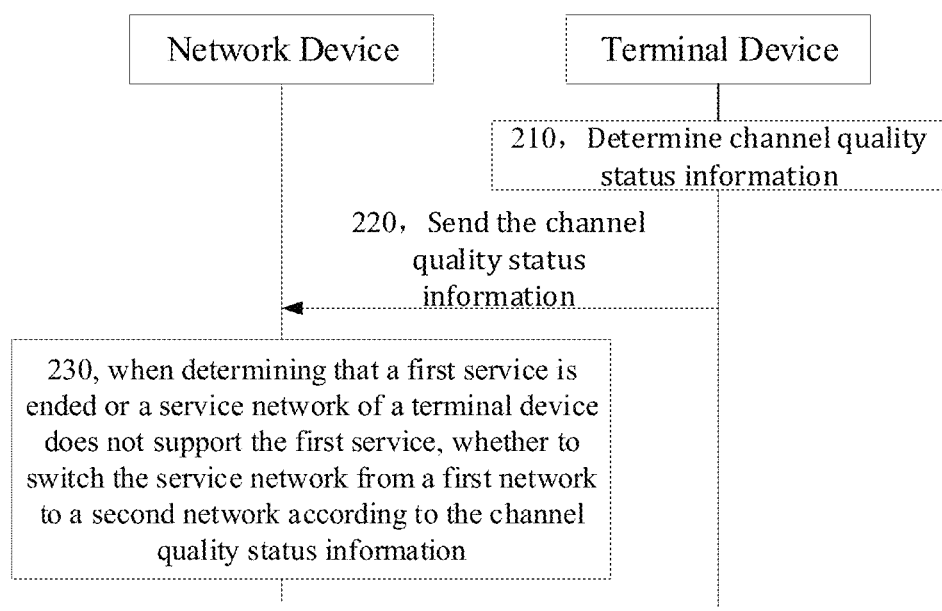
FIG. 2 is a schematic flowchart of a method for switching a network according to an embodiment of the present disclosure.

Specifically, as shown in FIG. 2, the method for switching a network includes:

At 210, the terminal device determines channel quality status information.

At 220, the network device sends the channel quality status information to the terminal device.

At 230, when the network device determines that the first service is ended or the service network of the terminal device does not support the first service, the network device determines whether to switch the service network from the first network to the second network according to the channel quality status information.

Specifically, the network device obtains channel quality status information, and the channel quality status information is used to reflect a channel quality of the second network; when the network device determines that the first service is ended or the service network of the terminal device does not support the first service, the network device determines whether to switch the service network from the first network to the second network according to the channel quality status information.

In the embodiment of the present disclosure, a quality of service (QoS) identifier level may be used to distinguish bearers/streams used to perform different services. For example, in an LTE network, the QoS Class Identifier (QCI) can be divided into 9 levels (1-9). A bearer with QCI=1 is used to perform a voice service, and a bearer with QCI=2 is used to perform a video service, and a QCI=9 bearer is used to perform a data service. For another example, in the NR network, the 5G Quality of Service Identifier (5QI) under the 5G network can also be divided into multiple levels. For example, a stream with 5QI=1 can be used to perform a voice service.

In other words, the first service in the embodiment of the present disclosure may be any one of a service on a second bearer, a second data stream, and a second quality of service QoS stream.

For example, the first service may be a 5QI=1 stream for performing a voice service.

It should be understood that the network device used to determine whether to switch the network in the embodiment of the present disclosure may be an access network device.

It should also be understood that the method for switching a network in the embodiment of the present disclosure may be applicable to a scenario where the first service is ended or the service network of the terminal device does not support the first service. The following describes an application scenario of the embodiment of the present disclosure with reference to FIG. 3.

Figure 3:
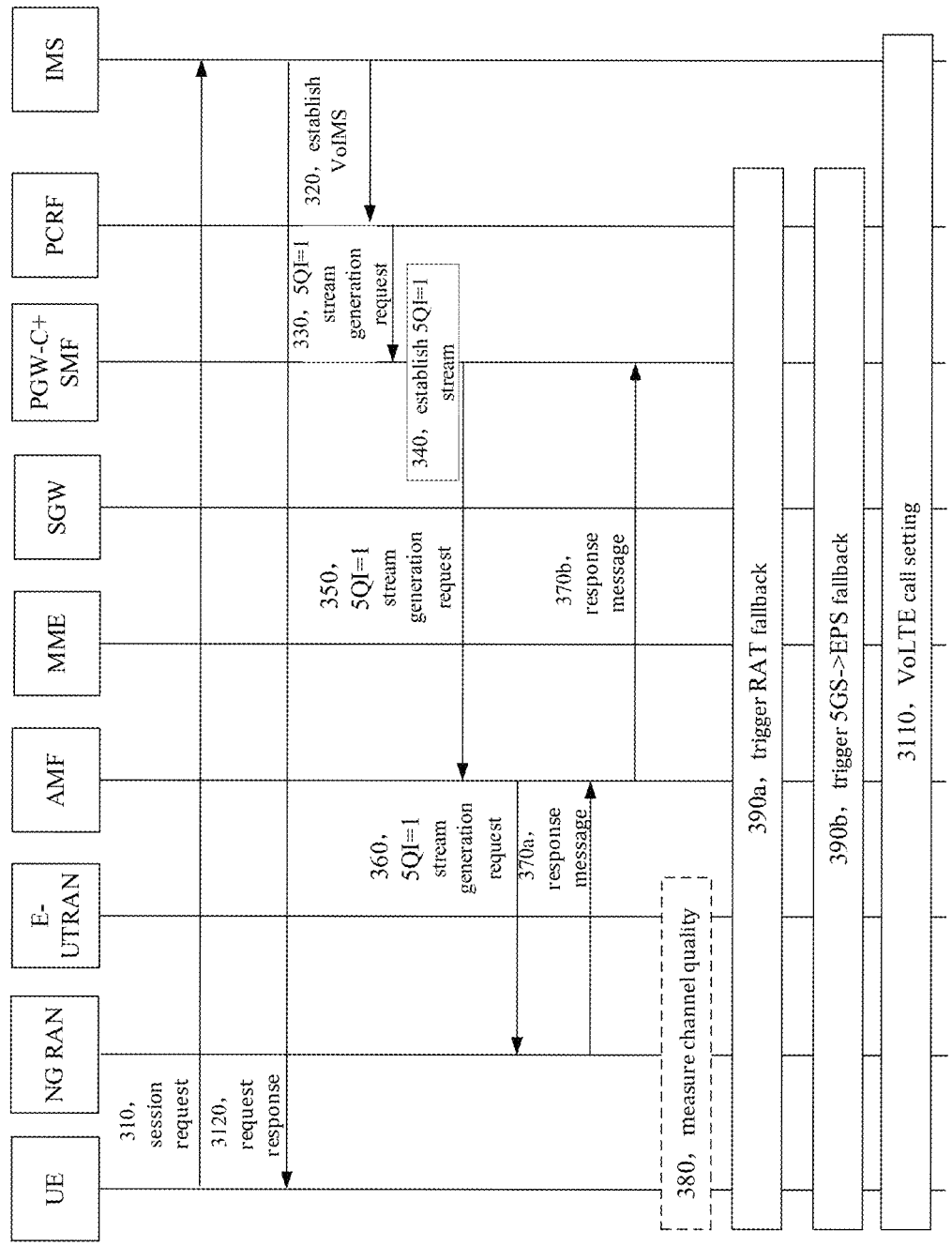
FIG. 3 is another schematic flowchart of a method for switching a network according to an embodiment of the present disclosure.

FIG. 3 is a schematic diagram of a RAT/EPS fallback process according to an embodiment of the present disclosure. EPS is a collective name of an Evolved UMTS Terrestrial Radio Access Network (E-UTRAN) and EPC, and 5GS is a collective name of a core network (5G Core, 5GC) of a NR network and a 5G wireless access network.

As shown in FIG. 3, the Radio Access Technology (RAT)/EPS fallback process includes the following steps.

At 310, the terminal device sends a session request to an information management system (IMS).

At 320, the IMS requests a policy charging and rules function (PCRF) to establish a Voice & video over IMS (VoIMS).

At 330, the PCRF sends a 5QI=1 stream generation request to a PGW-C+SMF.

At 340, the PGW-C+SMF establishes a 5QI=1 stream.

At 350, the PGW-C+SMF sends a 5QI=1 stream generation request to an AMF.

At 360, the AMF sends a 5QI=1 stream generation request to a NG RAN.

At 370a, the NG RAN sends a response message to a mobility management function (AMF).

At 370b, the AMF sends a response message to the PGW-C+SMF.

At 380, a channel quality between the Evolved UMTS Terrestrial Radio Access Network (E-UTRAN) and the terminal device is measured.

At 390a, a RAT fallback is triggered.

At 390b, a 5GS→EPS to fallback is triggered.

At 3110, Voice over LTE call settings is provided, wherein VoLTE is a voice service based on IMS.

At 3120, the IMS sends a request response to the terminal device.

It should be understood that, three situations will occur during the fallback.

1) 5GC remains unchanged, and AMF does not change (without AMF Relocation) during the RAT fallback.

In this case, the NG-RAN sends a rejection indication to the AMF at 370a, indicating that the rejection is caused by a handover (HO) being in progress. After the HO is completed, the AMF is responsible for triggering the establishment of a QCI=1 bearer immediately.

2) 5GC remains unchanged, and AMF changes (with AMF Relocation) during the RAT fallback.

In this case, the NG-RAN sends a reject indication to the AMF at 370a, indicating that the reject is caused by the HO being in progress. When the AMF changes, the AMF sends a reject indication to the SMF, indicating that the 5QI=1 stream sent by the SMF just now has not been successfully established (reject) due to the HO being in progress. After the HO is completed, the SMF is responsible for triggering the establishment of a QCI=1 bearer immediately.

3) 5GC→EPC fallback occurs, and RAT also switches from NR→LTE (EPS Fallback).

In this case, during the cross-system handover, SMF is a module (commonly referred to as SMF+PGW-C) that is a combination of SMF and PGW-C. This module is responsible for triggering establishment of a QCI=1 bearer immediately after the cross-system handover is completed.

In the embodiment of the present disclosure, after the VoLTE voice is completed by the terminal device, for the UE that performs 5G to 4G fallback in order to establish a voice, the channel quality status information can be used to determine whether the UE returns to 5G after ending the voice on the 4G network. It should be understood that the method in the embodiment of the present disclosure is not limited to the scenario shown in FIG. 3. For example, the method for switching a network in the embodiment of the present disclosure may also be applied to a scenario in which a terminal device falls back from 5G to 4G when a VoIMS is triggered.

It should be understood that the channel quality status information in the embodiments of the present disclosure may be used to reflect the channel quality of at least one network. For example, the channel quality status information may be used to reflect the channel quality of the second network.

The following describes the channel quality status information according to an embodiment of the present disclosure by way of example.

In one embodiment, the channel quality status information is a measurement result report sent by the terminal device.

Optionally, before the network device receives the measurement result report sent by the terminal device, the network device sends a release command to the terminal device, wherein the release command is used to instruct the terminal device to release the first service; the network device acquires a response message to the release command which is sent by the terminal device, wherein the response message includes the measurement result report.

It should be understood that the implementation of the network device receiving the measurement result report sent by the terminal device is not specifically limited in this embodiment of the present disclosure.

For example, the network device may periodically receive the measurement result report sent by the terminal device.

As another example, the network device may receive within a specific time unit the measurement result report sent by the terminal device.

For another example, the number of times for sending the measurement result report by the terminal device is a fixed number of times.

Further, before receiving the measurement result report sent by the terminal device, the network device may send configuration information to the terminal device, wherein the configuration information includes at least one of the following information:

a period, a number of times and a specific time unit for sending the measurement result report.

Therefore, the network device receives the measurement result report according to the indication information.

Optionally, in the embodiment of the present disclosure, before receiving the measurement result report sent by the terminal device, the network device may send the first indication information to the terminal device, wherein the first indication information is used to instruct the terminal device to send the measurement result report to the network device.

For example, the network device may send radio resource control (RRC) signaling to the terminal device, wherein the RRC signaling includes the first indication information.

As another example, the network device may send or receive data on a first bearer, and instruct the terminal device to send the measurement result report to the network device through the first bearer.

For another example, the network device may send or receive a first Quality of Service (QoS) stream or a first data stream, and instruct the terminal device to send the measurement result report to the network device through the first QoS stream or the first data stream.

As another example, the network device may send a release command to the terminal device, wherein the release command is used to instruct the terminal device to release the first service, and the release command includes the first indication information.

It should be understood that the embodiment of the present disclosure is not limited to using the first indication information to instruct the terminal device to send the measurement result report to the network device. For example, the first service in the embodiment of the present disclosure may also be used to trigger the terminal device to send the measurement result report to the network device.

In another embodiment, the channel quality status information is second indication information sent for the terminal device, wherein the second indication information is used to indicate that the second network is available, or the second indication information is used to indicate the second network is unavailable; therefore, when the network device determines that the first service is ended or the service network does not support the first service, the network device determines whether to switch the service network of the terminal device from the first network to the second network according to the second indication information.

In another embodiment, the network device may obtain the channel quality status information from a candidate network, wherein the candidate network includes the second network.

Optionally, the candidate network may obtain the channel quality status information through an uplink signal of the terminal device.

Optionally, the candidate network is a network having a direct or indirect interface with a network where the network device is located.

Optionally, the channel quality status information includes channel quality status information of the candidate network.

It should be understood that the method for switching a network in the embodiment of the present disclosure is designed to determine whether to perform switching based on channel quality status information when a service network of a terminal device is required to be switched. It should be noted that the channel quality status information in the embodiment of the present disclosure is information for determining whether to switch the service network of the terminal device when the first service meets a certain condition. That is, before making a decision, the network device needs to obtain the channel quality status information in advance.

Figure 4:
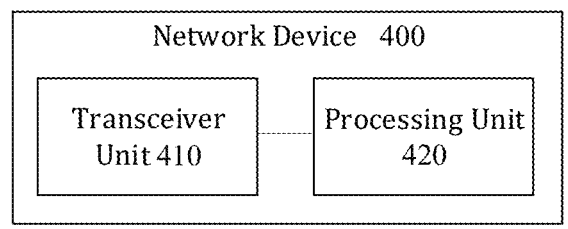
FIG. 4 is a schematic block diagram of a network device according to an embodiment of the present disclosure.

FIG. 4 is a schematic block diagram of a network device according to an embodiment of the present disclosure.

Specifically, as shown in FIG. 4, the network device 400 includes:

a transceiver unit 410 configured to obtain channel quality status information, wherein the channel quality status information is used to reflect the channel quality of a second network; a processing unit 420 configured to determine, when it is determined that a first service is ended or a service network of a terminal device does not support the first service, whether to switch the service network from a first network to the second network according to the channel quality status information.

Optionally, the channel quality status information is a measurement result report sent by the terminal device.

Optionally, the transceiver unit 410 is specifically configured to, before receiving the measurement result report sent by the terminal device, send a release command to the terminal device, wherein the release command is used to instruct the terminal device to release the first service; obtain a response message to the release command which is sent by the terminal device, wherein the response message includes the measurement result report.

Optionally, the transceiver unit 410 is more specifically configured to periodically receive the measurement result report sent by the terminal device.

Optionally, the transceiver unit 410 is more specifically configured to, within a specific time unit, receive the measurement result report sent by the terminal device.

Optionally, a number of times for sending the measurement result report by the terminal device is a fixed number of times.

Optionally, the transceiver unit 410 is more specifically configured to, before receiving the measurement result report sent by the terminal device, send configuration information to the terminal device, wherein the configuration information includes at least one of the following information: a period, a number of times and a specific time unit for sending the measurement result report; and receive the measurement result report according to the indication information.

Optionally, the transceiver unit 410 is further configured to:

before receiving the measurement result report sent by the terminal device, send first indication information to the terminal device for the network device, wherein the first indication information is used to instruct the terminal device to send the measurement result report to the network device.

Optionally, the transceiver unit 410 is specifically configured to send radio resource control RRC signaling to the terminal device, wherein the RRC signaling includes the first indication information.

Optionally, the transceiver unit 410 is specifically configured to send or receive data on a first bearer, and instruct the terminal device to send the measurement result report to the network device through the first bearer; or send or receive a first quality of service QoS stream or a first data stream, and instruct the terminal device to send the measurement result report to the network device through the first QoS stream or the first data stream.

Optionally, the transceiver unit 410 is specifically configured to send a release command to the terminal device, wherein the release command is used to instruct the terminal device to release the first service, and the release command includes the first indication information.

Optionally, the first service is used to trigger the terminal device to send the measurement result report to the network device.

Optionally, the channel quality status information is second indication information sent for the terminal device, wherein the second indication information is used to indicate that the second network is available, or the second indication information is used to indicate that the second network is unavailable; wherein the processing unit 420 is specifically configured to determine whether to switch the service network of the terminal device from the first network to the second network according to the second indication information when it is determined that the first service is ended or the service network does not support the first service.

Optionally, the transceiver unit 410 is specifically configured to obtain the channel quality status information from a candidate network, wherein the candidate network includes the second network.

Optionally, the candidate network may obtain the channel quality status information through an uplink signal of the terminal device.

Optionally, the candidate network is a network having a direct or indirect interface with a network where the network device is located.

Optionally, the channel quality status information includes channel quality status information of the candidate network.

Figure 5:
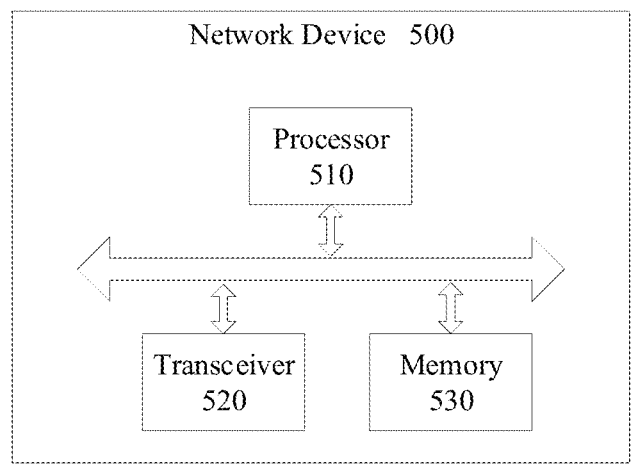
FIG. 5 is a schematic block diagram of another network device according to an embodiment of the present disclosure.

It should be noted that the transceiver unit 410 may be implemented by a transceiver, and the processing unit 420 may be implemented by a processor. As shown in FIG. 5, the network device 500 may include a processor 510, a transceiver 520, and a memory 530. The memory 530 may be configured to store indication information, and may also be used to store codes, instructions, and the like executed by the processor 510. Various components in the network device 500 are connected through a bus system. The bus system includes a power bus, a control bus, and a status signal bus in addition to a data bus.

The network device 500 shown in FIG. 5 can implement the processes implemented by the access network device in the above method embodiments in FIG. 2 and FIG. 3, details of which will not be repeated herein for brevity.

Figure 6:
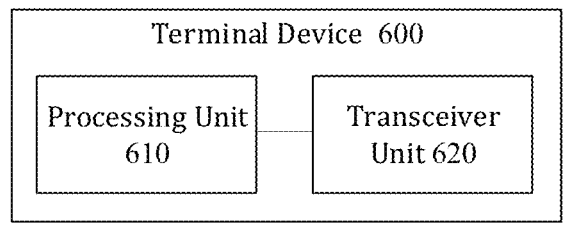
FIG. 6 is a schematic block diagram of a terminal device according to an embodiment of the present disclosure.

FIG. 6 is a schematic block diagram of a terminal device according to an embodiment of the present disclosure.

As shown in FIG. 6, the terminal device 600 includes:

a processing unit 610 configured to determine channel quality status information, wherein the channel quality status information is used to reflect a channel quality of a second network; and a transceiver unit 620 configured to send the channel quality status information to a network device, so that the network device, when it is determined that a first service is ended or a service network of a terminal device does not support the first service, determines whether to switch the service network from a first network to the second network according to the channel quality status information.

Optionally, the channel quality status information is a measurement result report of the terminal device, and the transceiver unit 620 is specifically configured to send the measurement result report to the network device.

Optionally, the transceiver unit 620 is more specifically configured to, before sending the measurement result report to the network device, receive a release command sent by the network device, wherein the release command is used to instruct the terminal device to release the first service; and send a response message to the release command to the network device, wherein the response message includes the measurement result report.

Optionally, the transceiver unit 620 is more specifically configured to periodically send the measurement result report to the network device.

Optionally, the transceiver unit 620 is more specifically configured to send the measurement result report to the network device within a specific time unit.

Optionally, a number of times for sending the measurement result report by the terminal device is a fixed number of times.

Optionally, the transceiver unit 620 is more specifically configured to, before sending the measurement result report to the network device, receive configuration information sent by the network device, wherein the configuration information includes at least one of the following information: a period, a number of times and a specific time unit for sending the measurement result report; and according to the indication information, send the measurement result report to the network device.

Optionally, the transceiver unit 620 is further configured to, before sending the measurement result report to the network device, receive first indication information sent by the network device, wherein the first indication information is used to instruct the terminal device to send the measurement result report to the network device.

Optionally, the transceiver unit 620 is specifically configured to receive radio resource control RRC signaling sent by the network device, wherein the RRC signaling includes the first indication information.

Optionally, the transceiver unit 620 is specifically configured to receive or send data on a first bearer, and instruct the terminal device to send the measurement result report to the network device through the first bearer; or receive or send a first quality of service QoS stream or a first data stream, and instruct the terminal device to send the measurement result report to the network device through the first QoS stream or the first data stream.

Optionally, the transceiver unit 620 is specifically configured to receive a release command sent by the network device, wherein the release command is used to instruct the terminal device to release the first service, and the release command includes the first indication information.

Optionally, the transceiver unit 620 is specifically configured to when starting the second service, a protocol of the second service triggers the terminal device to send the measurement result report to the network device.

Optionally, the processing unit 610 is specifically configured to generate second indication information, wherein the second indication information is used to indicate that the second network is available, or the second indication information is used to indicate that the second network is not available; wherein the transceiver unit 620 is specifically configured to send the second indication information to the network device.

Optionally, the processing unit 610 is more specifically configured to generate the indication information when the channel quality status information of the second network is greater than or equal to a first threshold; or, generate the indication information when a status packet error rate of the second network is less than or equal to a second threshold.

Optionally, the processing unit 610 is specifically configured to obtain the channel quality status information from a candidate network, wherein the candidate network includes the second network.

Optionally, the candidate network may obtain the channel quality status information through an uplink signal of the terminal device.

Optionally, the candidate network is a network having a direct or indirect interface with a network where the network device is located.

Optionally, the channel quality status information includes channel quality status information of the candidate network.

Optionally, the first service is any one of the following: a service on a second bearer, a second data stream, and a second quality of service QoS stream.

Figure 7:
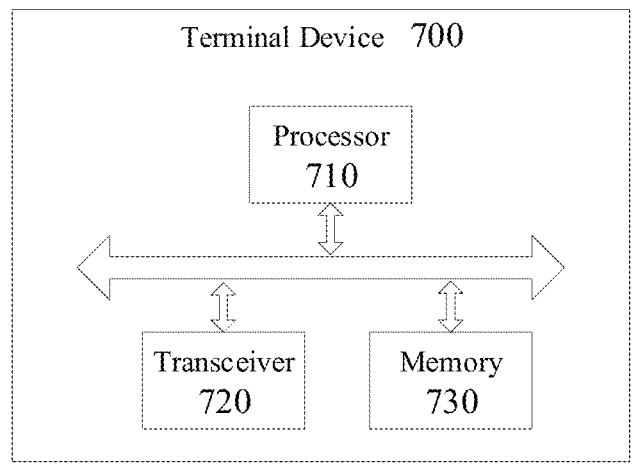
FIG. 7 is a schematic block diagram of another terminal device according to an embodiment of the present disclosure.

It should be noted that the processing unit 610 may be implemented by a processor, and the transceiver unit 620 may be implemented by a transceiver. As shown in FIG. 7, the terminal device 700 may include a processor 710, a transceiver 720, and a memory 730. The memory 730 may be configured to store indication information, and may also be used to store codes, instructions, and the like executed by the processor 710. Various components in the terminal device 700 are connected through a bus system. The bus system includes a power bus, a control bus, and a status signal bus in addition to the data bus.

The terminal device 700 shown in FIG. 7 can implement the processes implemented by the terminal device in the above method embodiments in FIG. 2 and FIG. 3, details of which will not be repeated herein for brevity.

It should be understood that the method embodiments in the embodiments of the present disclosure may be applied to a processor or performed by a processor.

In the implementation process, each step of the above method embodiment in the embodiments of the present disclosure may be completed by using hardware integrated logic circuits or instructions in the form of software in the processor. The steps of the method disclosed in connection with the embodiments of the present disclosure may be directly embodied as being executed by a hardware decoding processor, or may be executed and completed by using a combination of hardware and software modules in the decoding processor. A software module may be located in a well-known storage medium such as a random access memory, a flash memory, a read-only memory, a programmable read-only memory, or an electrically erasable programmable memory, a register, and the like. The storage medium is located in the memory, and the processor reads the information in the memory and completes the steps of the above method in combination with its hardware.

The processor may be an integrated circuit chip with signal processing capabilities, and may implement or execute the methods, steps, and logic block diagrams disclosed in the embodiments of the present disclosure. For example, the processor may be a general-purpose processor, a digital signal processor (DSP), an application specific integrated circuit (ASIC), a field programmable gate array (FPGA), or other programmable logic device, transistor logic device, discrete hardware component, and the like. In addition, the general-purpose processor may be a microprocessor or the processor may be any conventional processor or the like.

In addition, in the embodiments of the present disclosure, the memory may be a volatile memory or a non-volatile memory, or may include both volatile and non-volatile memory. The non-volatile memory may be a read-only memory (ROM), a programmable read-only memory (PROM), an erasable programmable read-only memory (erasable PROM, EPROM), or an erasable-programmable read-only memory (electrically EPROM, EEPROM) or a flash memory. The volatile memory may be a random access memory (RAM), which is used as an external cache. It should be understood that the memory is exemplary but not restrictive. For example, the memory in the embodiments of the present disclosure may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous connection dynamic random access memory (synch link DRAM, SLDRAM) and a direct memory bus random access memory (Direct Rambus RAM, DR RAM), etc. That is, the memory of the systems and methods described herein is intended to include, but is not limited to, these and any other suitable types of memory.

Finally, it should be noted that the terminology used in the embodiments of the present disclosure and the appended claims is for the purpose of describing particular embodiments only, and is not intended to limit the embodiments of the present disclosure.

For example, the singular forms "a", "the" and "said" used in the embodiments of the present disclosure and the appended claims are intended to include the plural forms as well, unless the context clearly indicates otherwise.

As another example, depending on the context, the word "upon" as used herein can be interpreted as "if" or "where" or "when" or "in response to determining" or "in response to detecting". Similarly, depending on the context, the phrases "if determining" or "if detecting (the stated condition or event)" can be interpreted as "when determining" or "in response to determining" or "when detecting (the stated condition or event)" or "in response to detecting (the stated condition or event)".

It should be appreciated by those skilled in the art that the units and algorithm steps of each example described in combination with the embodiments disclosed herein can be implemented by electronic hardware, or a combination of computer software and electronic hardware. Whether these functions are performed in hardware or software depends on the specific application and design constraints of the technical solution. A professional technician can use different methods to implement the described functions for each specific application, but such implementation should not be considered to be beyond the scope of the present disclosure.

Those skilled in the art can clearly understand that, for the convenience and brevity of description, the specific working processes of the systems, devices, and units described above can refer to the corresponding processes in the above method embodiments, which will not be repeated herein.

In the several embodiments provided in this application, it should be understood that the disclosed systems, devices, and methods can be implemented in other ways. For example, the device embodiments described above are only schematic. For example, the division of the unit is only a logical function division. In actual implementation, there may be another division manner. For example, multiple units or components may be combined or may be integrated into another system, or some features can be ignored or skipped. In addition, the displayed or discussed mutual coupling or direct coupling or communication connection may be indirect coupling or communication connection through some interfaces, devices or units, which may be electrical, mechanical or in other forms.

The units described as separate components may or may not be physically separated, and the components displayed as units may or may not be physical units, that is, may be located in one place, or may be distributed on multiple network units. Some or all of the units may be selected according to actual needs to achieve the objective of the solution of the embodiments of the present disclosure.

In addition, each functional unit in each embodiment of the present disclosure may be integrated into one processing unit, or each of the units may exist separately in physical, or two or more units may be integrated into one unit.

When being implemented in the form of software functional units and sold or used as independent products, it can be stored in a computer-readable storage medium. Based on such an understanding, the technical solution of the embodiments of the present disclosure is, in essence, or with a part that contributes to the existing technology or a part of the technical solution, may be embodied in the form of a software product, wherein the computer software product is stored in a storage medium, including a number of instructions to enable a computer device (which may be a personal computer, a server, or a network device, etc.) to perform all or part of the steps of the method described in the embodiments of the present disclosure. The above storage media include: a U disk, a mobile hard disk, a read-only memory, a random access memory, a magnetic disk, or an optical disk and other medium that can store program codes.

The above is only specific implementations of the embodiments of the present disclosure, but the protection scope of the present disclosure is not limited thereto, and modifications or substitutions easily conceived by any person skilled in the art within the technical scope of the present disclosure should be covered by the protection scope of the present disclosure. Therefore, the protection scope of the present disclosure shall be subject to the protection scope of the claims.

What is claimed is:

1. A method for switching a network, comprising:
   obtaining, by a network device, channel quality status information, wherein the channel quality status information is used to reflect the channel quality of a second network; and
   determining, by the network device, when determining that a first service is ended or a service network of a terminal device does not support the first service, whether to switch the service network from a first network to the second network according to the channel quality status information,
   wherein the channel quality status information is a measurement result report sent by the terminal device,
   wherein before the network device receiving the measurement result report sent by the terminal device, the method further comprises:
      sending, by the network device, first indication information to the terminal device, wherein the first indication information is used to instruct the terminal device to send the measurement result report to the network device, and
   wherein the sending, by the network device, the first indication information to the terminal device, comprises:
      sending, by the network device, a release command to the terminal device, wherein the release command is used to instruct the terminal device to release the first service, and the release command comprises the first indication information.

2. The method according to claim 1, wherein the network device receiving the measurement result report sent by the terminal device comprises:
   receiving within a specific time unit, by the network device, the measurement result report sent by the terminal device.

3. The method according to claim 2, wherein a number of times for sending the measurement result report by the terminal device is a fixed number of times.

4. The method according to claim 1, wherein the obtaining, by the network device, the channel quality status information, comprises:
   obtaining, by the network device, the channel quality status information from a candidate network, wherein the candidate network comprises the second network.

5. The method according to claim 4, wherein the candidate network can obtain the channel quality status information through an uplink signal of the terminal device.

6. The method according to claim 4, wherein the candidate network is a network having a direct or indirect interface with a network where the network device is located.

7. The method according to claim 1, wherein the channel quality status information comprises channel quality status information of a candidate network.

8. The method according to claim 1, wherein the first service is any one of:
   a service on a second bearer, a second data stream, and a second quality of service QoS stream.

9. A method for switching a network, comprising:
   determining, by a terminal device, channel quality status information, wherein the channel quality status information is used to reflect a channel quality of a second network; and
   sending, by the terminal device, the channel quality status information to a network device, so that the network device, when determining that a first service is ended or a service network of the terminal device does not support the first service, determines whether to switch the service network from a first network to the second network according to the channel quality status information,
   wherein the channel quality status information is a measurement result report of the terminal device;
   wherein the sending, by the terminal device, the channel quality status information to the network device, comprises:
      sending, by the terminal device, the measurement result report to the network device,
   wherein before the terminal device sends the measurement result report to the network device, the method further comprises:
      receiving, by the terminal device, first indication information sent by the network device, wherein the first indication information is used to instruct the terminal device to send the measurement result report to the network device, and
   wherein the receiving, by the terminal device, the first indication information sent by the network device, comprises:
      receiving, by the terminal device, a release command sent by the network device, wherein the release command is used to instruct the terminal device to release the first service, and the release command comprises the first indication information.

10. A network device, comprising:
    a transceiver configured to obtain channel quality status information, wherein the channel quality status information is used to reflect the channel quality of a second network; and
    a processor configured to determine, when determining that a first service is ended or a service network of a terminal device does not support the first service, whether to switch the service network from a first network to the second network according to the channel quality status information,
    wherein the channel quality status information is a measurement result report sent by the terminal device,
    wherein the transceiver is further configured to:
       before receiving the measurement result report sent by the terminal device, send first indication information to the terminal device for the network device, wherein the first indication information is used to instruct the terminal device to send the measurement result report to the network device, and
    wherein the transceiver is specifically configured to:
       send a release command to the terminal device, wherein the release command is used to instruct the terminal device to release the first service, and the release command comprises the first indication information.

11. The network device according to claim 10, wherein the transceiver is specifically configured to:
   obtain a response message to the release command which is sent by the terminal device, wherein the response message comprises the measurement result report.

12. The network device according to claim 10, wherein the transceiver is more specifically configured to:
   periodically receive the measurement result report sent by the terminal device.

13. The network device according to claim 10, wherein the transceiver is specifically configured to:
   send radio resource control RRC signaling to the terminal device, wherein the RRC signaling comprises the first indication information.

14. The network device according to claim 10, wherein the transceiver is specifically configured to:
   send or receive data on a first bearer, and instruct the terminal device to send the measurement result report to the network device through the first bearer; or
   send or receive a first quality of service QoS stream or a first data stream, and instruct the terminal device to send the measurement result report to the network device through the first QoS stream or the first data stream.

15. The network device according to claim 10, wherein the first service is used to trigger the terminal device to send the measurement result report to the network device.

16. The network device according to claim 10, wherein the channel quality status information is second indication information sent for the terminal device, wherein the second indication information is used to indicate that the second network is available, or the second indication information is used to indicate that the second network is unavailable;
   wherein the processor is specifically configured to:
      determine whether to switch the service network of the terminal device from the first network to the second network according to the second indication information when it is determined that the first service is ended or the service network does not support the first service.

* * * * *